(12) United States Patent
Carr

(10) Patent No.: US 6,525,929 B2
(45) Date of Patent: Feb. 25, 2003

(54) COMPUTER CHASSIS DOOR WITH POSITION DAMPING DETENT HINGE

(75) Inventor: Daniel Shawn Carr, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 09/769,793

(22) Filed: Jan. 25, 2001

(65) Prior Publication Data

US 2002/0097560 A1 Jul. 25, 2002

(51) Int. Cl.[7] .............................. H05K 5/03; H05K 5/02
(52) U.S. Cl. .................... 361/683; 361/679; 312/223.2; 312/293.2; 49/371
(58) Field of Search ........................ 361/724, 683–686, 361/679, 725–727; 49/371, 373; 312/293.1–293.3, 223.1–223.6; 16/221, 232, 252, 253, 255, 257, 277–308

(56) References Cited

U.S. PATENT DOCUMENTS

| | | | | |
|---|---|---|---|---|
| 4,804,238 A | * | 2/1989 | Bischof et al. | 220/348 |
| 4,997,103 A | * | 3/1991 | Daly | 206/1.5 |
| 5,068,765 A | * | 11/1991 | Nimpoeno | 16/334 |
| 5,111,503 A | * | 5/1992 | Takagi | 16/260 |
| 5,116,261 A | * | 5/1992 | Lan et al. | 292/225 |
| 5,169,218 A | * | 12/1992 | Chu | 312/223.2 |
| 5,424,913 A | | 6/1995 | Swindler | |
| 5,586,003 A | | 12/1996 | Schmitt et al. | |
| 5,593,220 A | * | 1/1997 | Seid et al. | 292/DIG. 38 |
| 5,661,797 A | * | 8/1997 | Leman et al. | 379/433.13 |
| 5,692,045 A | * | 11/1997 | Takagi et al. | 379/433.13 |
| 5,724,226 A | * | 3/1998 | Ruch et al. | 361/683 |
| 5,781,408 A | * | 7/1998 | Crane et al. | 361/683 |
| 5,815,379 A | * | 9/1998 | Mundt | 361/683 |
| 5,816,672 A | * | 10/1998 | LaPointe et al. | 292/34 |
| 5,819,163 A | * | 10/1998 | Tsukamoto et al. | 455/348 |
| 5,924,782 A | * | 7/1999 | Park | 16/342 |
| 5,983,083 A | * | 11/1999 | Horne | 455/550 |
| 6,099,097 A | * | 8/2000 | Hocker et al. | 16/225 |
| 6,108,417 A | * | 8/2000 | Thomas et al. | 379/433.13 |
| 6,119,019 A | * | 9/2000 | Phelps | 455/550 |
| 6,125,031 A | * | 9/2000 | Della Fiora et al. | 220/842 |
| 6,130,822 A | * | 10/2000 | Della Fiora et al. | 16/254 |
| 6,157,717 A | * | 12/2000 | Chintala et al. | 379/433.13 |
| 6,209,173 B1 | * | 4/2001 | Salter et al. | 16/335 |
| 6,256,481 B1 | * | 7/2001 | Jeong et al. | 379/433.13 |

FOREIGN PATENT DOCUMENTS

EP        0749212 A2 * 12/1996 ............ H04B/1/08

* cited by examiner

Primary Examiner—Anatoly Vortman
(74) Attorney, Agent, or Firm—Haynes and Boone, LLP

(57) ABSTRACT

A computer chassis includes a door mounted on the chassis. A hinge pivotally interconnects the door and the chassis. The hinge has a first end connected to the chassis and a second end connected to the door. A pair of spaced apart resilient receivers are provided on the chassis. A cam extension on the hinge is engaged for flexing the resilient receivers in response to pivotal movement of the hinge.

19 Claims, 6 Drawing Sheets

COMPUTER CHASSIS DOOR WITH POSITION DAMPING DETENT HINGE

BACKGROUND

The disclosures herein relate generally to computer systems and more particularly to a position damping detent hinge for a computer chassis door.

Computer chassis and/or bezels include doors which cover access slots and ports. These doors are subjected to frequent openings and closings and are usually pivotally mounted on the computer chassis. The pivotal movement required to open the doors is usually at least 90°. Most doors do not have a hinge which provides a quality feel or a tactile feel when being pivoted. Also, most doors do not include a means for retaining the door in an open position without the aid of additional parts.

Therefore, what is needed is a computer chassis door which includes a hinge having a built-in cam which urges the door into maintaining the open position and the closed position.

SUMMARY

One embodiment, accordingly, provides a cammed hinge which helps to hold the door in the open position and the closed position. To this end, a computer chassis door includes a door mounted on the chassis. A hinge pivotally interconnects the door and the chassis. The hinge has a first end connected to the chassis and a second end connected to the door. A pair of spaced apart resilient receivers are provided on the chassis. A cam extension on the hinge is engaged for flexing the resilient receivers in response to pivotal movement of the hinge.

A principal advantage of this embodiment is that the hinge provides a holding force to maintain the door in the open and closed position. The hinge is of a simple and inexpensive construction. A constant pressure is applied to the hinge during the pivotal motion which provides a position damping detent tactile feel when the door is being manually moved.

DETAILED DESCRIPTION

Figure 1:
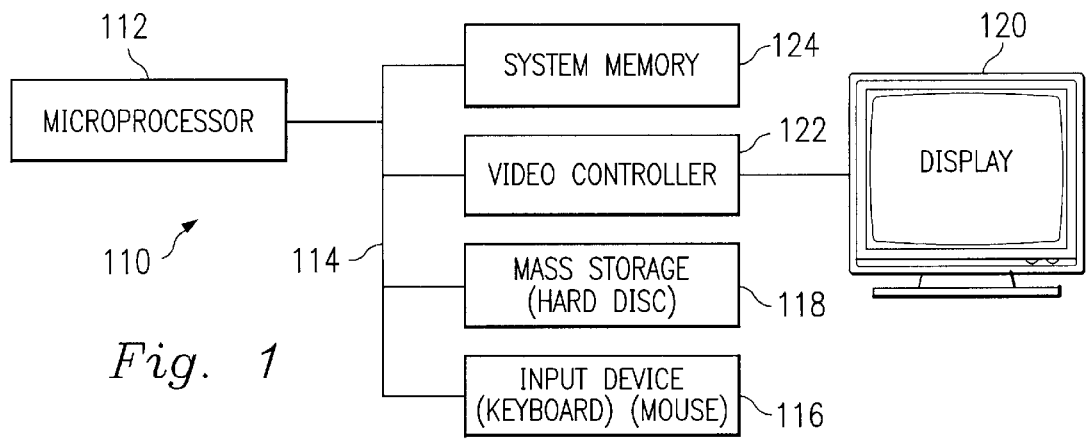
FIG. 1 is a diagrammatic view illustrating an embodiment of a computer system.

In one embodiment, computer system 110, FIG. 1, includes a microprocessor 112, which is connected to a bus 114. Bus 114 serves as a connection between microprocessor 112 and other components of computer system 110. An input device 116 is coupled to microprocessor 112 to provide input to microprocessor 112. Examples of input devices include keyboards, touchscreens, and pointing devices such as mouses, trackballs and trackpads. Programs and data are stored on a mass storage device 118, which is coupled to microprocessor 112. Mass storage devices include such devices as hard disks, optical disks, magneto-optical drives, floppy drives and the like. Computer system 110 further includes a display 120, which is coupled to microprocessor 112 by a video controller 122. A system memory 124 is coupled to microprocessor 112 to provide the microprocessor with fast storage to facilitate execution of computer programs by microprocessor 112. It should be understood that other busses and intermediate circuits can be deployed between the components described above and microprocessor 112 to facilitate interconnection between the components and the microprocessor.

Figure 2:
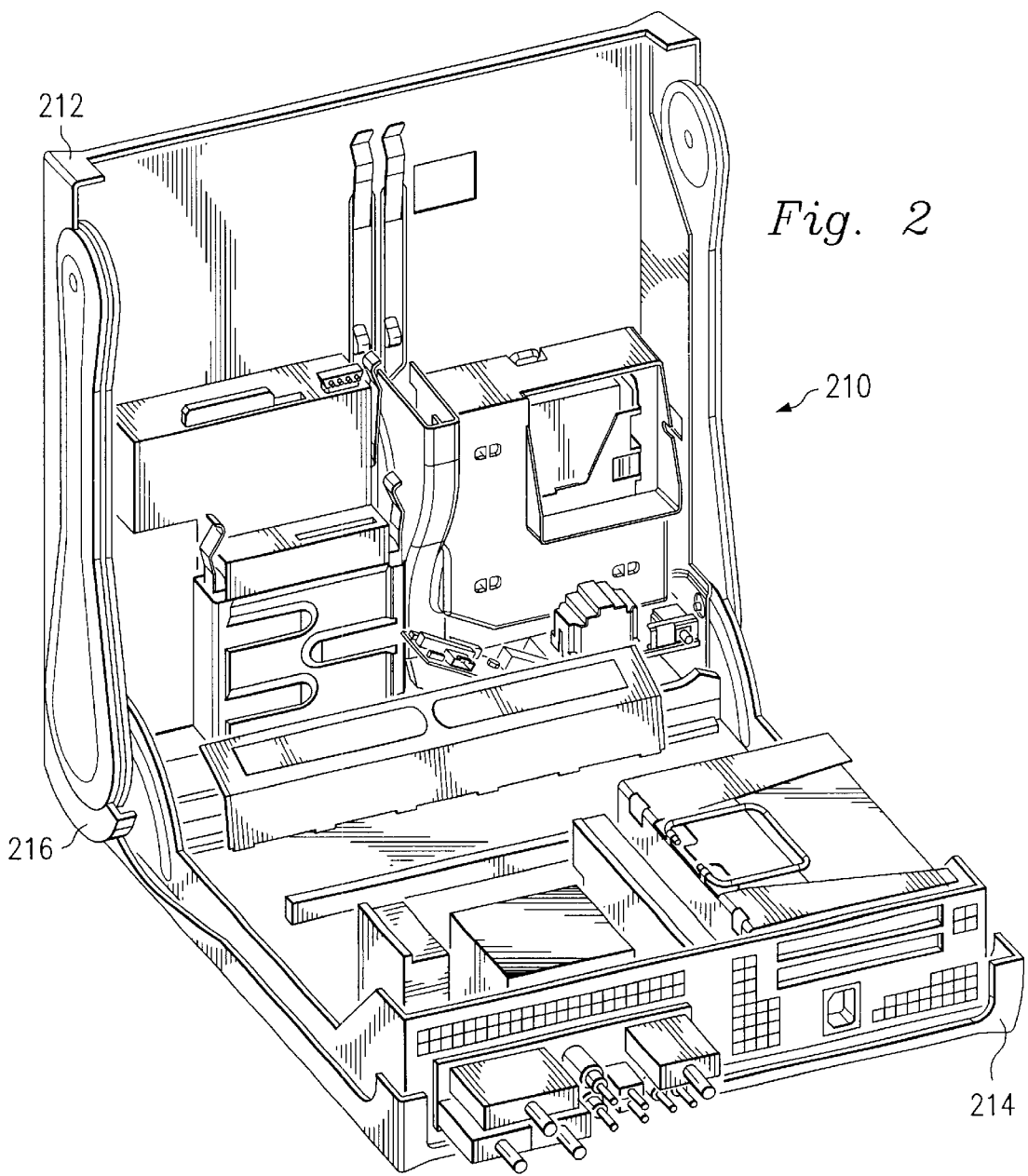
FIG. 2 is a perspective view illustrating an embodiment of a computer chassis.

A computer chassis is generally designated 210 in FIG. 2, shown in an open position, and includes a first portion 212 pivotably connected to a second portion 214 so that the chassis 210 can be pivoted to a closed position wherein first portion 212 is nested with second portion 214. A bezel 216 of chassis 210 requires doors provided for consumer accessible input-output (I/O) devices, e.g., USB ports, audio ports, etc.

Figure 3:
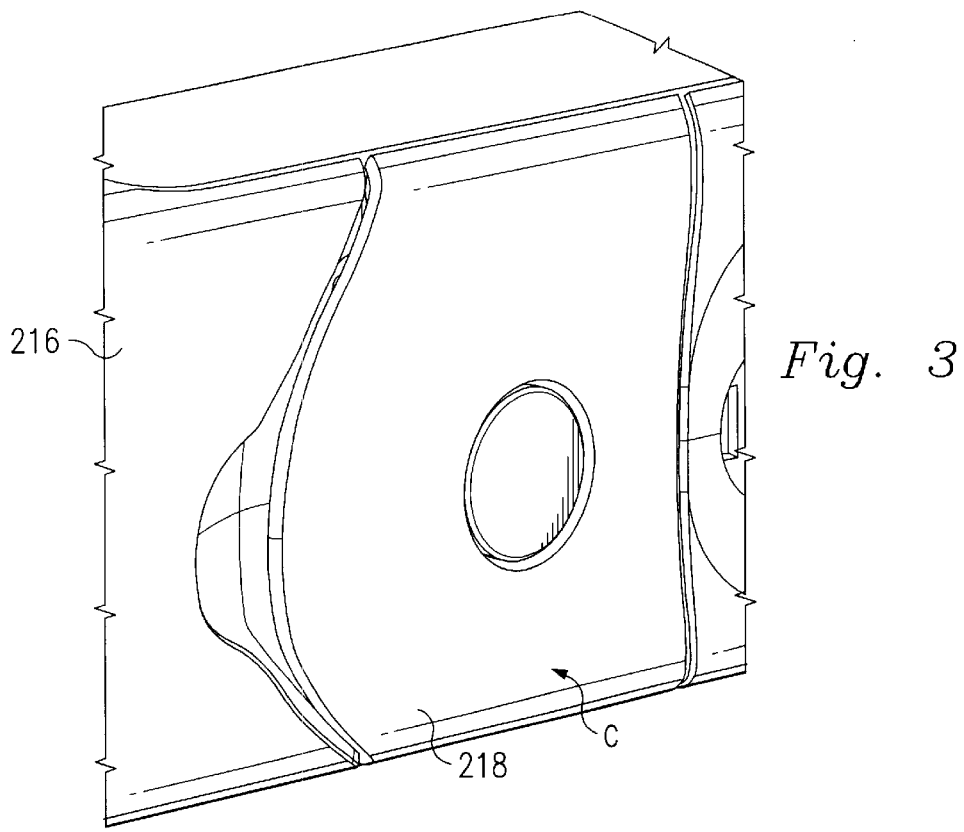
FIG. 3 is a partial perspective view illustrating an embodiment of a portion of a bezel and a door in a closed position.
Figure 4:
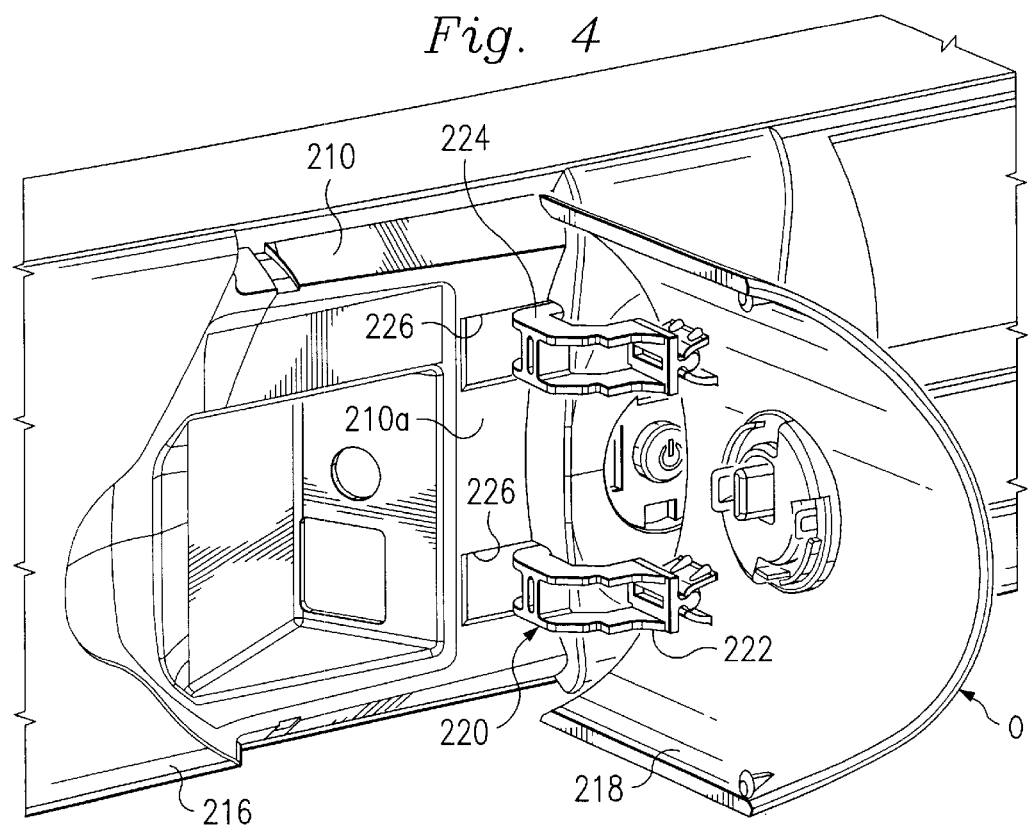
FIG. 4 is a partial perspective view illustrating the door of FIG. 3 in an open position.

Bezel 216, FIG. 3 includes a door 218 mounted thereon and pivotable between a closed position C and an open position O, FIG. 4. The pivotal motion of door 218 is accomplished by a hinge 220 connecting door 218 to the chassis 210. Hinge 220 includes an end 222 connected to door 218 and an opposite end 224 connected to chassis 210. A wall 210a of chassis 210 includes a pair of openings 226 for receiving end 224 of hinge 220. In this manner, end 224 of hinge 220 is connected internally of wall 210a, not visible in FIG. 4, and end 222 extends through openings 226 externally of wall 210a for connection to door 218.

Figure 5:
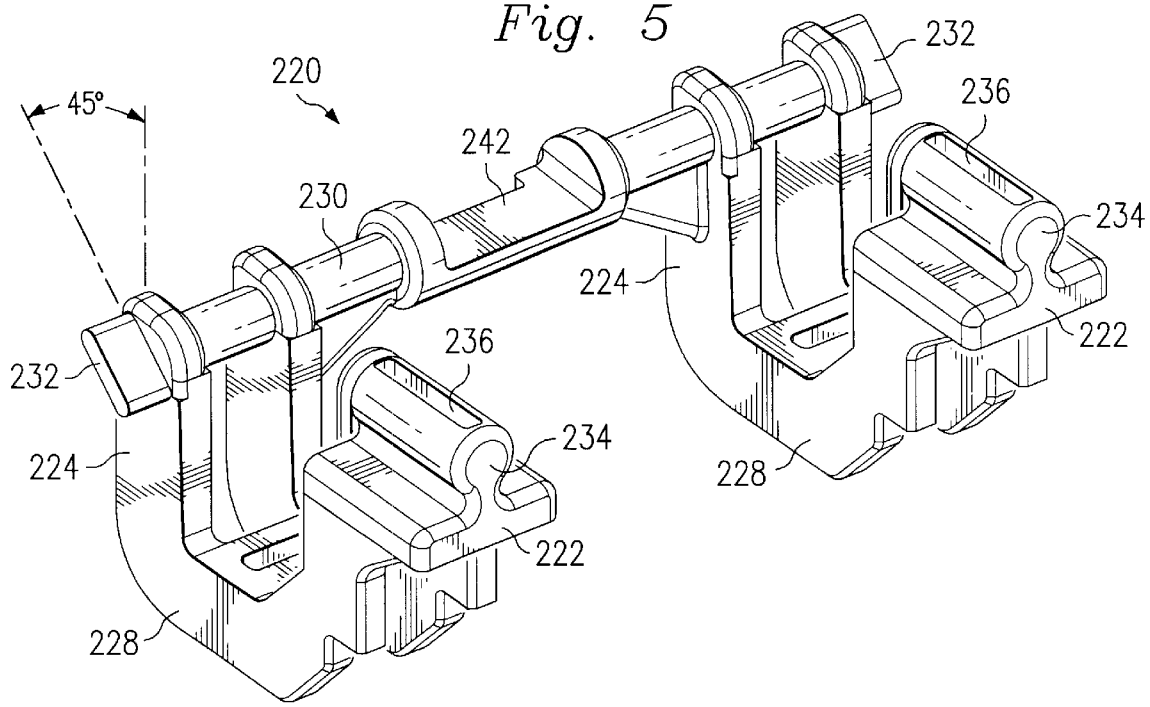
FIG. 5 is a perspective view illustrating an embodiment of a hinge.

Hinge 220, FIG. 5 includes a pair of U-shaped arms 228 interconnected by an axle 230 adjacent end 224. A cam extension 232 is formed on each opposite end of axle 230. Each cam extension 232 is angularly disposed at about a 45° angle relative to a respective adjacent arm 228. End 222 of each arm 228 includes a cylindrical snap-in member 234 including an axial slot 236 formed therein.

Figure 6:
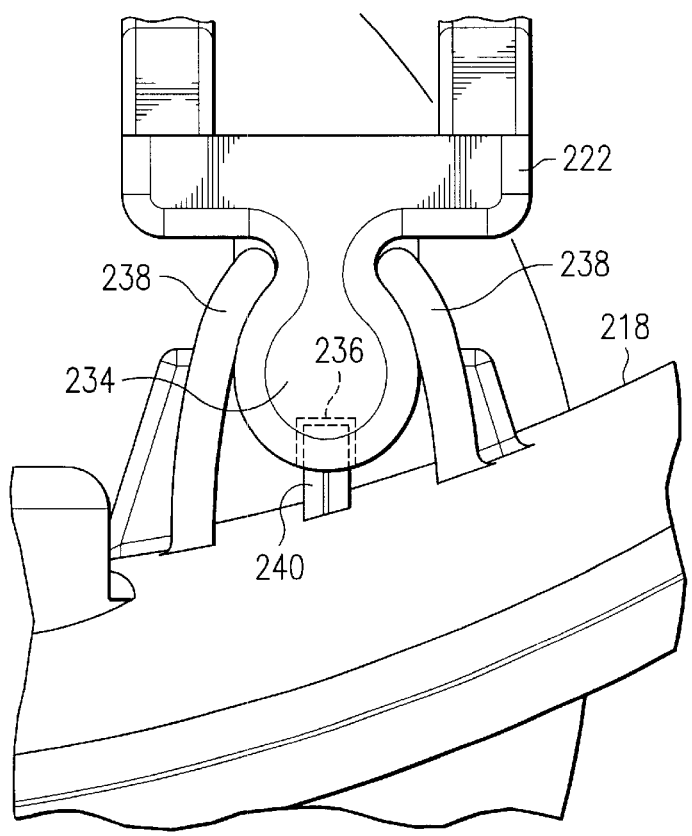
FIG. 6 is a partial perspective view illustrating the hinge connected to the door.
Figure 7:
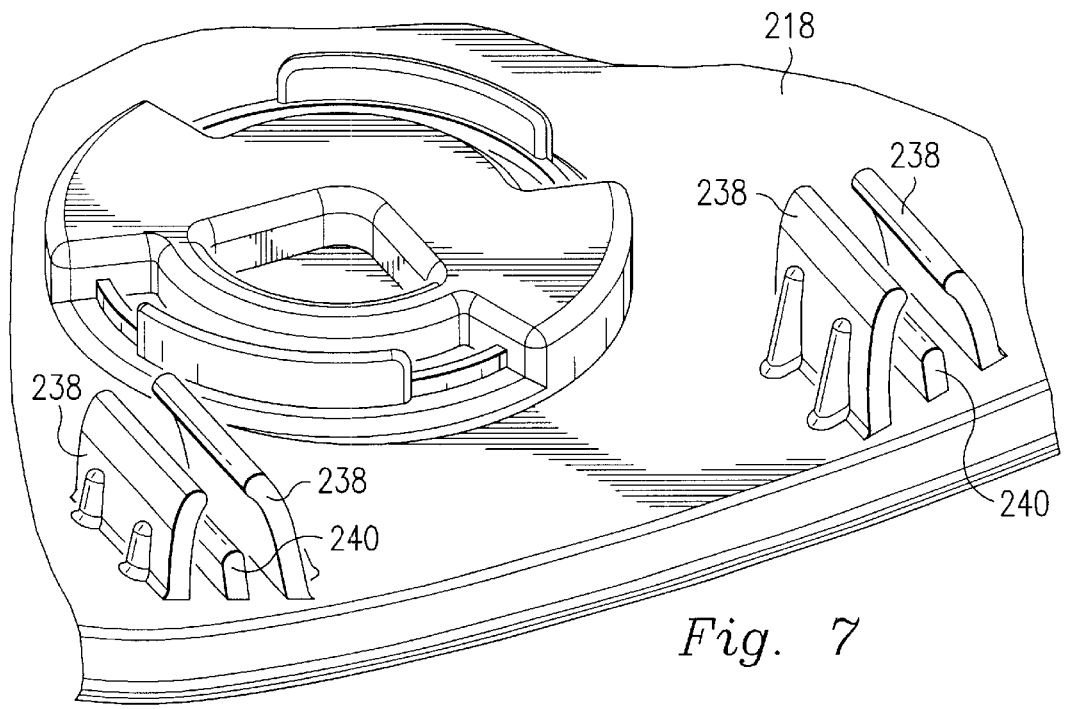
FIG. 7 is a partial perspective view illustrating an embodiment of the door connection for receiving the hinge.

Each snap-in member 234, FIGS. 6 and 7 is received by a respective claw-shaped pair of snap tabs 238 attached to door 218. The snap tabs 238 converge or are inclined toward each other and include an elongated tooth member 240 between each tab for seating in slot 236 when snap-in member 234 is engaged by tabs 238.

End 224, FIGS. 5 and 8–10, of hinge 220 is connected internally of chassis 210 by means of a snap connection with a mid-portion 242 of axle 230 which snaps into an axle receiver 244 on an internal surface of chassis wall 210a. Each cam extension 232 seats between a pair of spaced apart receivers 246 which resiliently engage cam receiver 232 with a positive force.

Figure 8:
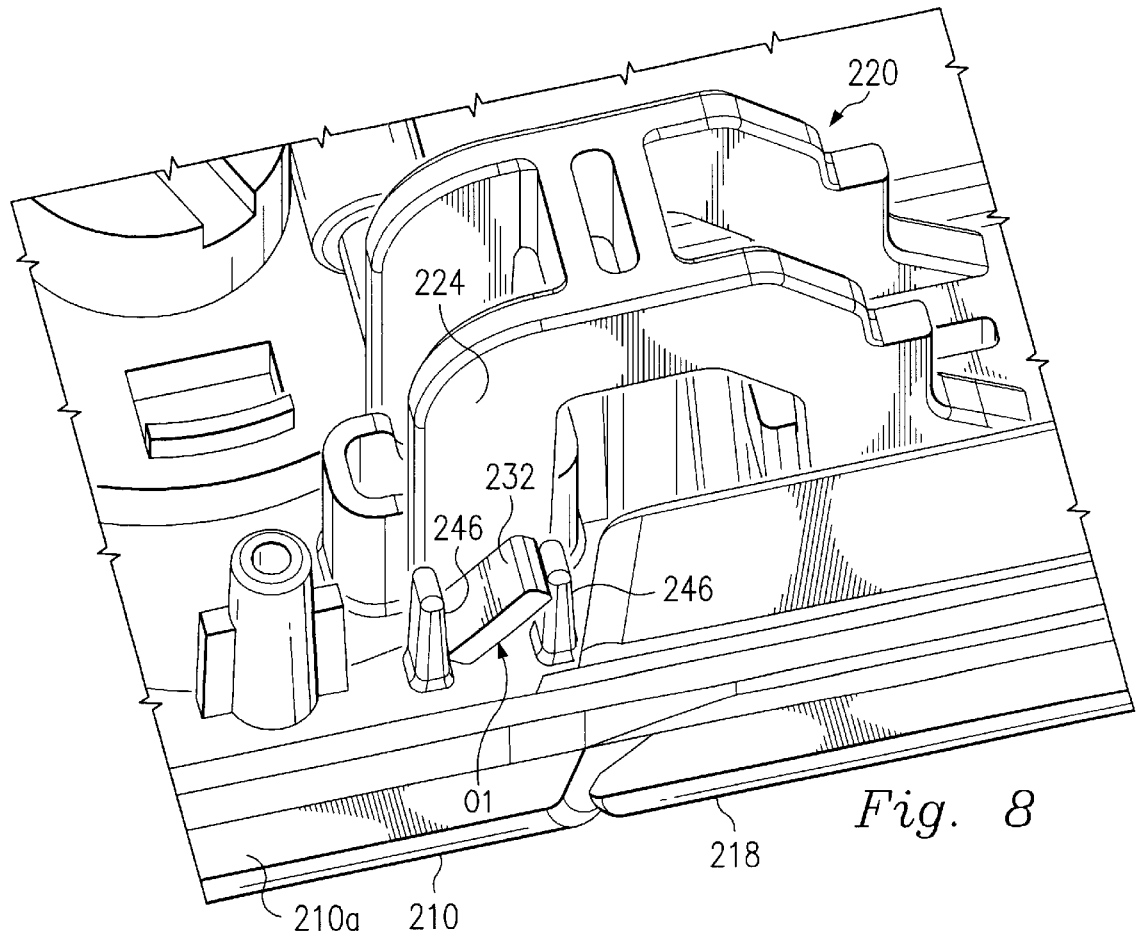
FIGS. 8–10 are partial perspective views illustrating an embodiment of the hinge cam extensions for retaining the door in the open and closed positions.

In operation, when door 218 is in the closed position C, FIGS. 3 and 8, cam extensions 232 are angularly disposed in a first orientation O1, between the inwardly flexed receivers 246 which maintain a positive force on extensions 232 to urge door 218 closed. Hinge 220 is positioned within chassis 210.

Figure 9:
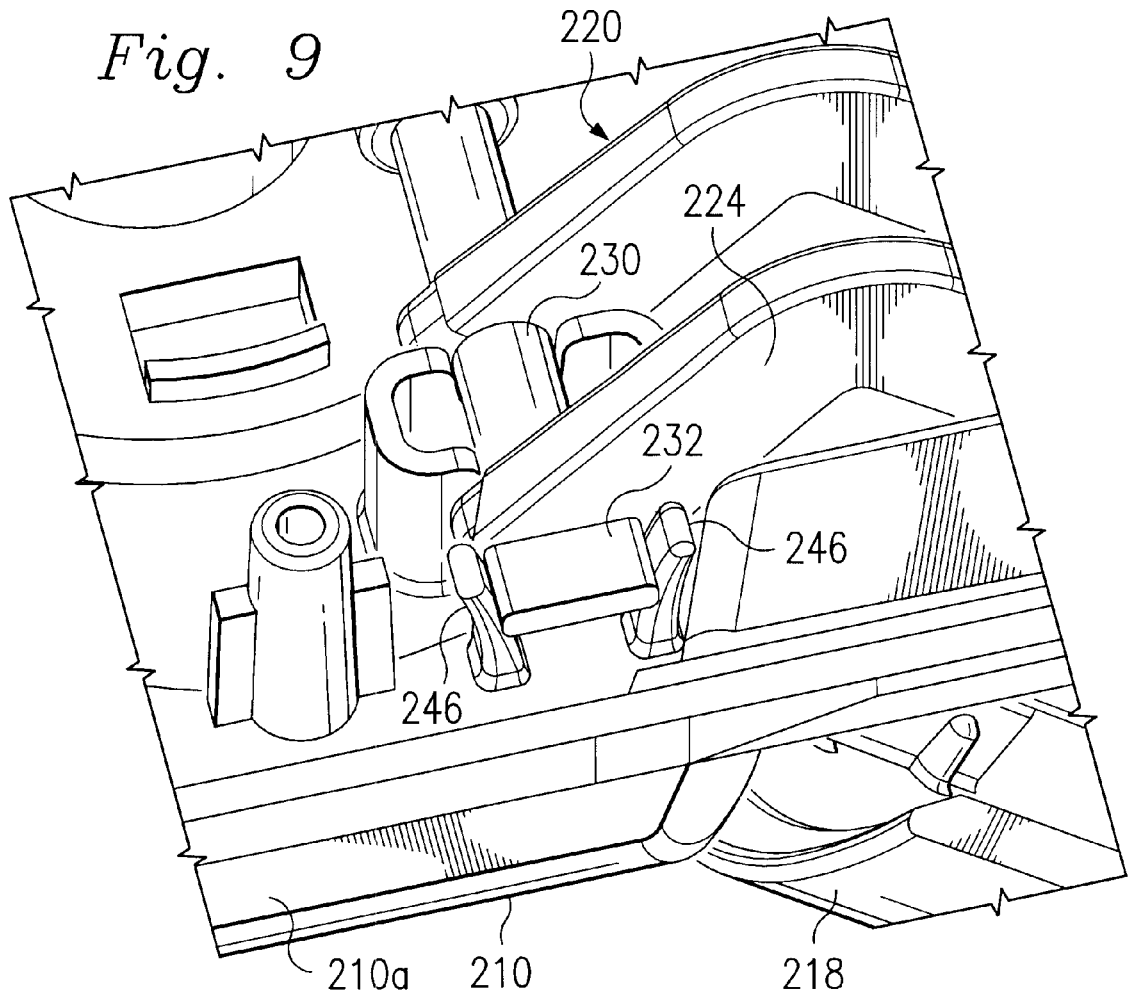
Figure 10:
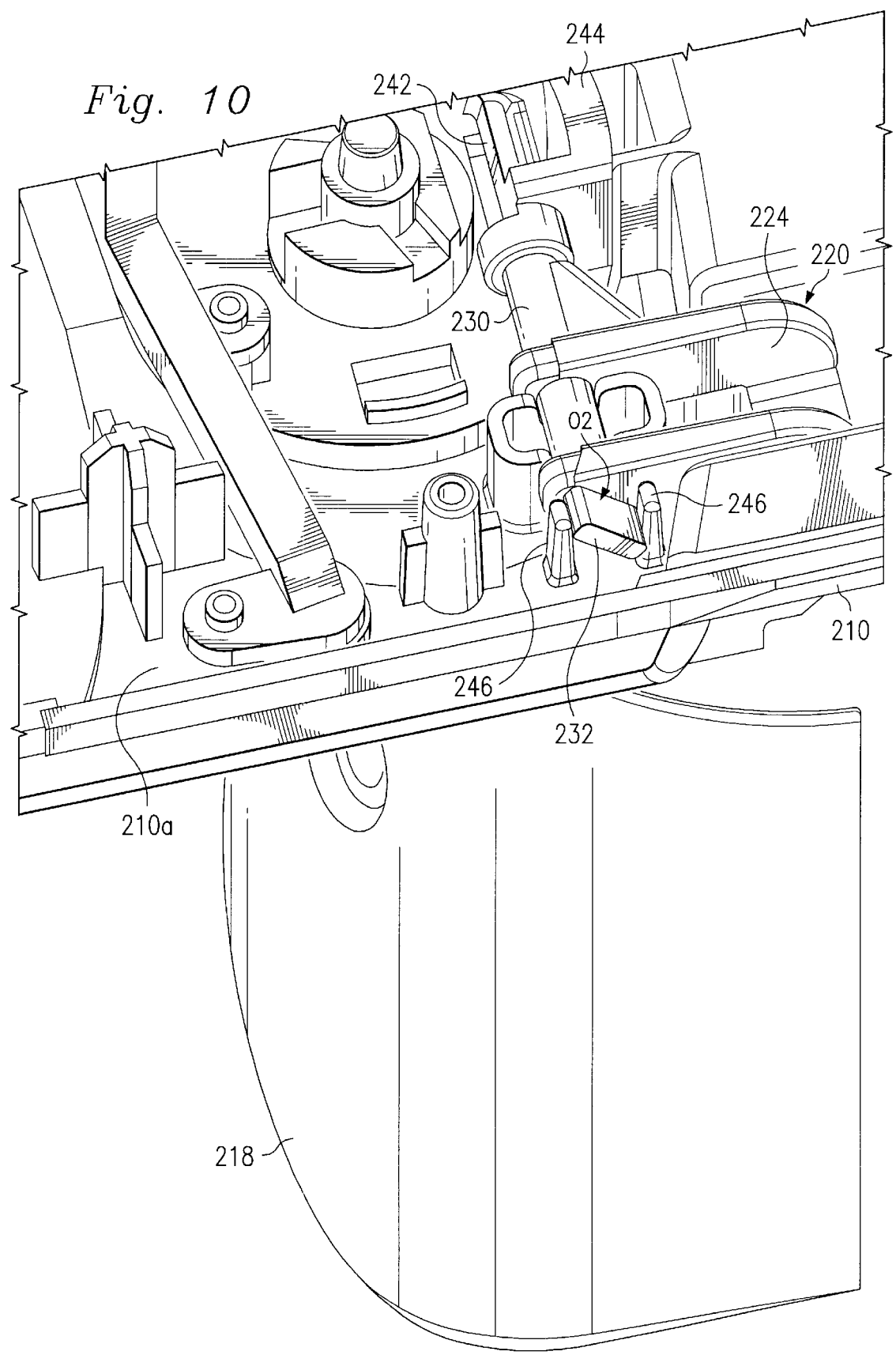

Movement of door 218 towards the open position, FIG. 9, flexes receivers 246 apart and partially extends hinge 220 out of chassis 210. Further movement of door 218, to the fully open position, FIGS. 4 and 10, angularly disposes cam extensions 232 in a second orientation O2, between the inwardly flexed receivers 246 which again maintains a positive force on extensions 232 to urge door 218 open. Hinge 220 is fully extended out of chassis 210.

As it can be seen, the principal advantages of these embodiments are that the hinge provides a holding force to maintain the door in the open and closed position. The hinge is of a simple and inexpensive construction. A constant pressure is applied to the hinge during the pivotal motion which provides a position damping detent tactile feel when the door is being manually moved.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer chassis door comprising:
   a chassis;
   a door mounted on the chassis;
   a hinge pivotally connecting the door on the chassis, the chassis including a wall having an opening therein, the hinge extending through the opening, the hinge having a first end connected to the chassis and a second end connected to the door;
   a pair of spaced apart resilient receivers on the chassis; and
   a cam extension on the hinge engaged for flexing the resilient receivers in response to pivotal movement of the hinge.

2. The chassis door as defined in claim 1 wherein the first end is connected internally of the chassis and the second end extends through the opening externally of the chassis.

3. The chassis door as defined in claim 2 wherein the hinge includes an axle connected to the first end.

4. The chassis door as defined in claim 3 wherein the axle is pivotally connected to the chassis.

5. The chassis door as defined in claim 1 wherein the cam extension is adjacent the first end of the hinge and extends at an angle relative to the hinge.

6. The chassis door as defined in claim 1 wherein the hinge includes a pair of U-shaped arms.

7. The chassis door as defined in claim 6 wherein the hinge includes an axle extending between each of the arms.

8. The chassis door as defined in claim 7 wherein the cam extension is adjacent the first end of the hinge.

9. The chassis door as defined in claim 8 wherein the cam extension extends at an angle relative to the hinge.

10. A computer system comprising:
    a chassis;
    a microprocessor mounted in the chassis;
    a storage coupled to the microprocessor;
    a door mounted on the chassis;
    a hinge pivotally connecting the door on the chassis, the chassis including a wall having an opening therein, the hinge extending through the opening, the hinge having a first end connected to the chassis and a second end connected to the door;
    a pair of resilient receivers on the chassis; and
    an angled cam extension on the hinge engaged for flexing the resilient receivers in response to pivotal movement of the hinge.

11. The system as defined in claim 10 wherein the first end is connected internally of the chassis and the second end extends through the opening externally of the chassis.

12. The system as defined in claim 11 wherein the hinge includes an axle connected to the first end.

13. The system as defined in claim 12 wherein the axle is pivotally connected to the chassis.

14. The system as defined in claim 10 wherein the cam extension is adjacent to the first end of the hinge and extends at an angle relative to the hinge.

15. The system as defined in claim 10 wherein the hinge includes a pair of U-shaped arms.

16. The system as defined in claim 15 wherein the hinge includes an axle extending between each of the arms.

17. The system as defined in claim 16 wherein the cam extension is adjacent the first end of the hinge.

18. The system as defined in claim 17 wherein the cam extension extends at an angle relative to the hinge.

19. A computer door hinge comprising:
    a chassis;
    a door mounted on the chassis;
    a hinge arm pivotally connecting the door on the chassis, the hinge arm having a first end connected within the chassis and a second end extending from the chassis and connected to the door;
    the hinge including a pair of U-shaped arms and an axle extending between each of the arms;
    a pair of spaced apart resilient receivers on the chassis; and
    a cam extension on the hinge engaged between the resilient receivers for flexing the receivers apart in response to pivotal movement of the hinge.

* * * * *